United States Patent [19]

Banno et al.

[11] Patent Number: 4,549,120
[45] Date of Patent: Oct. 22, 1985

[54] TURNTABLE DC BRUSHLESS MOTOR STOPPING CONTROL

[75] Inventors: Tsutomu Banno; Michiaki Hayashi; Hitoshi Senso, all of Saitama, Japan

[73] Assignee: Pioneer Electronic Corporation, Tokyo, Japan

[21] Appl. No.: 515,224

[22] Filed: Jul. 19, 1983

[30] Foreign Application Priority Data

Jul. 19, 1982 [JP] Japan .................. 57-109177[U]

[51] Int. Cl.⁴ .................................. H02P 6/02
[52] U.S. Cl. .................... 318/254; 318/138; 318/365; 318/373; 318/439
[58] Field of Search ............ 318/254 A, 254, 138, 318/439, 256, 264, 265, 371, 373, 744

[56] References Cited

U.S. PATENT DOCUMENTS

| 3,819,997 | 6/1974 | Morton et al. | 318/373 X |
| 4,127,799 | 11/1978 | Nakamura et al. | 318/254 A X |
| 4,172,990 | 10/1979 | Everett et al. | 318/138 X |

FOREIGN PATENT DOCUMENTS

| 0074385 | 6/1980 | Japan | 318/254 |
| 0059305 | 5/1981 | Japan | 318/254 |
| 0052397 | 3/1982 | Japan | 318/254 |
| 0075597 | 5/1982 | Japan | 318/254 |
| 57-101580 | 6/1982 | Japan | 318/373 |
| 57-148585 | 9/1982 | Japan | 318/373 |
| 58-29381 | 2/1983 | Japan | 318/744 |
| 2077530 | 12/1981 | United Kingdom | 318/254 |

Primary Examiner—William M. Shoop, Jr.
Assistant Examiner—Bentsu Ro
Attorney, Agent, or Firm—Sughrue, Mion, Zinn Macpeak & Seas

[57] ABSTRACT

A drive motor control device for a video disk player or the like operates to brake the motor by driving it reversely upon reception of a rotation termination signal, until it is detected that the motor has stopped and rotates reversely. The motor is then driven forwardly for a predetermined time before being allowed to rotate freely to a stop.

6 Claims, 14 Drawing Figures

FIG. 1  PRIOR ART
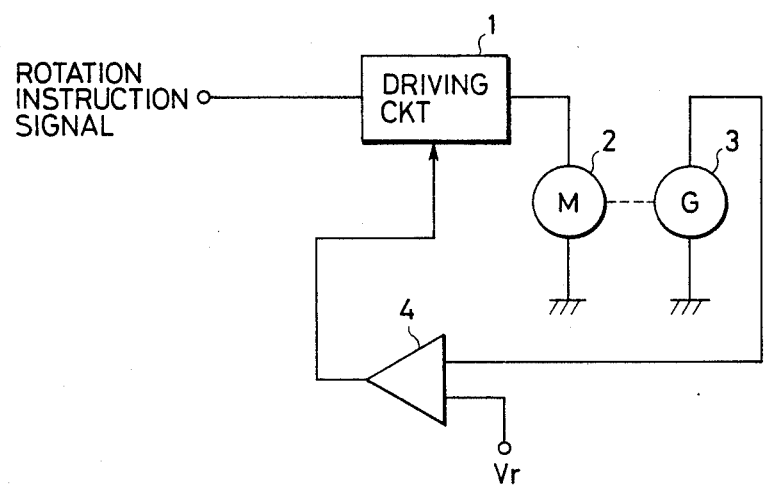
FIG. 2a
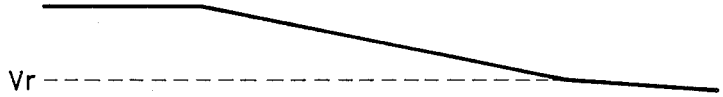
FIG. 2b
FIG. 2c

TURNTABLE DC BRUSHLESS MOTOR STOPPING CONTROL

BACKGROUND OF THE INVENTION

The present invention relates to an energizing and deenergizing device for a d.c. motor, and particularly to a brushless d.c. motor having a rotary spindle whose coefficient of friction is very small.

In a case where a brushless d.c. motor is used to drive a turntable of a video disc player or the like, the turntable may continue to rotate for a long period of time even if the power supply thereto is removed when the reproduction of music is over. This phenomenon causes the exchange of discs to be difficult, and, therefore, it has been common to design the motor energizing and deenergizing device such that the motor and hence the turntable is stopped upon termination of the power supply to the motor when reproduction is ended.

FIG. 1 shows an example of the conventional motor driving and stopping device for a video disc player. In FIG. 1, a brushless motor is connected to a driving circuit 1. A d.c. generator 3 is mechanically coupled to a rotational shaft (not shown) of the motor 2 so that a d.c. voltage, the level of which is in proportion to the rotational speed of the motor 2, is induced at an output of the d.c. generator 3. A comparator 4 is connected to the output of the d.c. generator 3 and functions to compare the output voltage of the d.c. generator 3 with a predetermined reference voltage Vr. An output terminal of the comparator 4 is connected to the driving circuit 1.

With the motor driving and stopping device constructed as above, when a high level rotation instruction signal such as shown in FIG. 2a is supplied to the driving circuit 1, the latter responds thereto to control the brushless motor 2 to rotate in a predetermined direction, at a predetermined rotational speed. At this moment, since the output voltage of the d.c. generator 3, the level of which is proportional to the speed of the d.c. motor 3, is larger than the reference voltage Vr, the output of the comparator 4 is at a low level. Then, when the rotation instruction signal to the drive circuit 1 is terminated and the input level to the drive circuit 1 becomes low, the drive circuit 1 drives the motor 2 in a manner so as to urge rotation in the reverse direction. Therefore, a rotational torque is developed in a direction opposite to the predetermined direction, and consequently the rotational speed of the motor 2 in the predetermined direction is gradually decreased. In reaction, the output voltage of the d.c. generator 3 is also lowered as shown in FIG. 2b, and when it becomes smaller than the reference voltage Vr, the output of the comparator 4 assumes a high level as shown in FIG. 2c. With this high level output of the comparator, the drive circuit 1 functions to stop the driving of the motor 2, resulting in no torque being generated by the latter. Therefore, the motor 2 is rotated freely only by the inertia of the turntable (not shown). It should be noted that the drive circuit 1 functions to drive the motor 2 in the predetermined direction so long as the rotation instruction signal is supplied, even if the output level of the comparator 4 is high.

In the conventional motor drive/stop device constructed as above, in order to shorten the time duration from the commencement of free rotation of the motor to complete stoppage, it is sufficient to set the reference voltage at a low value. However, since the frictional coefficient of the motor spindle depends upon the motor used even if the reference voltage is set at a given low level, the setting of the reference voltage per se is difficult and there may be problems such that, depending upon the motor to be used, it may be impossible to completely stop the motor within a desired short time duration.

SUMMARY OF THE INVENTION

An object of the present invention is to provide a d.c. motor drive/stop device which is capable of stopping the motor within a desired short time duration.

The d.c. motor drive/stop device according to the present invention is constructed such that the motor is driven reversely to the desired direction upon a rotation stop instruction, the reverse rotation of the motor is detected, and, when detected, the motor is driven in the desired direction for a predetermined time from the detection.

BRIEF DESCRIPTION OF THE DRAWINGS

FIG. 1 is a block diagram showing an example of a conventional drive/stop device;

FIGS. 2a to 2c show operational waveforms of the circuit of FIG. 1;

FIGS. 5a to 5c illustrate a variation of the delay in detecting the reversed rotation.

DETAILED DESCRIPTION OF THE PREFERRED EMBODIMENTS

Preferred embodiments of the present invention will now be described in detail with reference to FIGS. 3 and 4.

Figure 3:
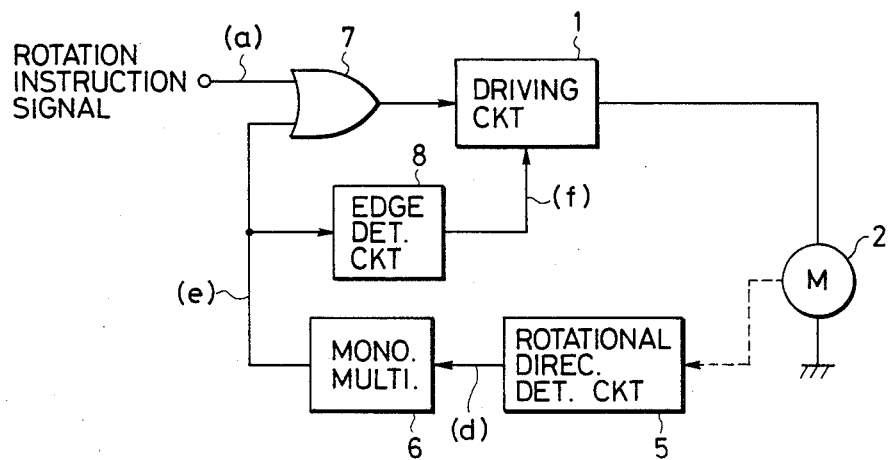
FIG. 3 is a block diagram showing an embodiment of the drive/stop device according to the present invention.

In FIG. 3, a rotational direction detecting circuit 5 provides a high output when the rotational direction of the motor 2 is reversed from the predetermined forward direction. A monostable multivibrator 6 is connected to the rotational direction detecting unit 5, which produces a pulse having a predetermined width upon reception of the output signal from the rotational detecting circuit 5. To the monostable multivibrator 6, an OR-gate 7 and an edge detecting circuit 8 are connected. The OR-gate 7 operates on the output signal from the monostable multivibrator 6 and the rotation instruction signal to obtain the logical OR operation thereof, the result being sent to the drive circuit 1. The edge detecting circuit 8 functions to detect the trailing edge of the output pulse from the multivibrator 6. An output terminal of the edge detecting circuit 8 is connected to the drive circuit 1.

Figure 4A:
FIGS. 4a to 4f show operational waveforms of the circuit of FIG. 3.
Figure 4B:
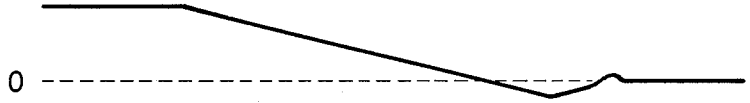
Figure 4C:

With reference to FIGS. 4a–4f, it should be noted that FIGS. 4a and 4d–4f illustrative waveforms occurring at locations designated by corresponding reference characters (a) and (d)–(f) in FIG. 3. FIG. 4b illustrates the rotational speed of the motor, and FIG. 4c represents a bipolar signal indicating the direction of the motor. In the drive/stop device of the present invention thus constructed, when the high level rotational direction instruction signal is supplied through the OR-gate 7 to the drive circuit 1, as shown in FIG. 4a, the latter causes the motor 2 to rotate in the predetermined direction and controls the rotation thereof to a predetermined speed. Then, when the drive instruction signal to the drive circuit 1 is stopped and the input level to the drive circuit 1 becomes low, the drive circuit 1 drives the motor 2 to urge rotation in the reverse direction. Since the motor 2 generates a torque which is opposite in direction to that generated when it rotates in the forward direction, the rotational speed of the motor 2 is gradually lowered as shown in FIG. 4b until the motor eventually rotates in the reverse direction.

Figure 4D:
Figure 4E:
Figure 4F:
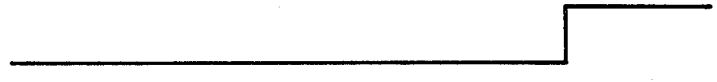

In FIG. 4c, the sign (+) indicates forward rotation and (−) indicates reverse rotation. When the rotational direction detecting circuit 5 detects this reversed rotation a short time after it occurs, the output thereof is switched from a low level to a high level as shown in FIG. 4d. With this high level output, the multivibrator 6 produces a high level pulse having a predetermined width as shown in FIG. 4e. The high output pulse from the mono-stable multivibrator 6 is supplied through the OR-gate 7 to the drive circuit 1. The latter circuit responds to the pulse to again drive the motor in the forward direction for a time period corresponding to the width of this pulse. Therefore, the motor 2 generates rotational torque in the forward direction and thus the rotational speed of the motor 2 in that direction is increased. Thereafter, when the output pulse from the multivibrator 6 disappears, the output from the edge detecting circuit 8 is reversed from the low to the high level as shown in FIG. 4f. Upon this high level output, the drive circuit 1 terminates the driving of the motor 2 resulting in no torque generation. Therefore, the motor 2 is rotated freely due to the inertia of the turntable (not shown). Since the speed of the free rotation of the turntable and motor is very low, the motor may be stopped immediately.

FIGS. 4a–4f illustrate the condition in which a slight overshoot occurs at the end of the short forward direction pulse of FIG. 4e. Under ideal conditions, it is hoped that no such overshoot will occur. The waveforms in this case would be substantially as shown, except that the overshoot would not occur at the end of the last upward slope in FIG. 4b and the corresponding polarity reversals in FIGS. 4c and 4d would not occur.

Figures 5A, 5B, 5C:
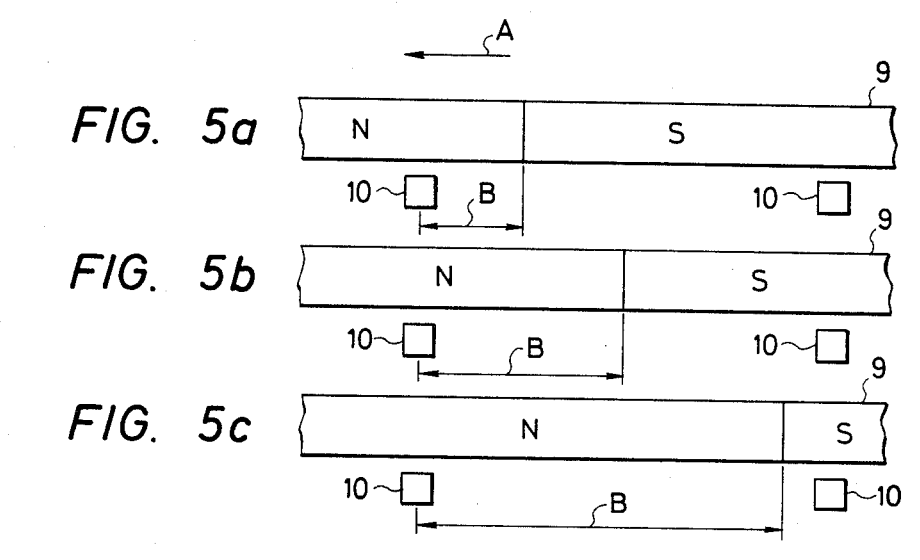

In this embodiment, factors governing the time period from the commencement of free rotation of the motor to the complete stoppage thereof are the width of the pulse from the multivibrator 6 and the difference in time between the rotational reversal and the detection thereof by the rotational direction detecting circuit 5. The pulse width of the multivibrator 6 can be suitably selected. However, when, for example, a Hall element is used as a detecting element of the detecting circuit 5, the time difference depends upon the relative position of the Hall element and the rotor of the motor at the time when the latter is temporarily stopped. That is, assuming the three relative positions between the Hall element 10 and the rotor 9 of the motor as shown in FIGS. 5a, 5b and 5c, when the latter is temporarily stopped, the reversed rotation may be detected at times B after the motor 2, i.e., the rotor 9 thereof, is rotated in the reversed direction A, respectively. However, the time period B per se can be shortened by providing a plurality of Hall elements about the rotor periphery such that the angle between adjacent Hall elements is sufficiently small.

As described hereinbefore, according to the d.c. motor drive/stop device of the present invention, the motor is driven in the direction reverse to the forward direction until after a time when the motor is stopped, and the reversal of the rotational direction is detected. Immediately after the reversal of rotation is detected, the motor is driven in the forward direction for a predetermined time period. Therefore, it is always possible to stop the motor within a short period of time.

What is claimed is:

1. A device for energizing and deenergizing a d.c. motor comprising: driving means responsive to a rotation instruction for generating a first drive signal to drive the d.c. motor in a predetermined direction and responsive to a rotation termination instruction for generating a second drive signal to slow said motor and eventually drive said d.c. motor in a reverse direction, detection means for detecting reverse rotation of the
   d.c. motor and producing a detection signal when said motor is rotating in said reverse direction, said driving means being responsive to the detection signal to apply said first signal to the d.c. motor for a predetermined period of time.

2. A device as claimed in claim 1, wherein said detection means comprises a plurality of Hall elements disposed about the periphery of the motor rotor.

3. A device as claimed in claim 1, wherein said driving means comprises a drive circuit for effecting driving of said motor in either direction in response to a first input signal.

4. A device as claimed in claim 3, further including a monostable multivibrator for producing an output pulse of said predetermined period in response to said detection signal.

5. A device as claimed in claim 4, wherein said first input signal to said drive circuit comprises the logical OR-operation of said multivibrator output pulse and said rotation termination instruction.

6. A device as claimed in claim 5, further including edge detecting means for detecting the trailing edge of said multivibrator output pulse and for producing an output instruction signal to said drive circuit, as a second input signal thereto, said drive circuit terminating driving of said motor in response to said output instruction signal.

* * * * *